United States Patent Office 3,424,810
Patented Jan. 28, 1969

3,424,810
REDUCTION IN VINYLIDENE CONTENT IN AN ALPHA-OLEFIN MIXTURE CONTAINING THE SAME
Joseph Charles Suatoni, Lower Burrell, Pa., assignor to Gulf Research & Development Company, Pittsburgh, Pa., a corporation of Delaware
No Drawing. Filed Feb. 8, 1967, Ser. No. 614,552
U.S. Cl. 260—677                    4 Claims
Int. Cl. C07c 7/12, 11/00

ABSTRACT OF THE DISCLOSURE

A mixture comprising normal alpha-olefins and vinylidenes is treated with the acid form of a sulfonic acid cation exchange resin which possesses a macroreticular structure to yield a resultant composition having greater amounts of normal alpha-olefins and less vinylidenes. The resulting composition is useful to alkylate aromatic compounds in the preparation of biodegradable detergents.

BACKGROUND OF THE INVENTION

This invention relates to the increase in alpha-olefin content and the concurrent substantial reduction of vinylidene content in an olefin mixture comprising alpha-olefins and vinylidenes.

Ethylene can be polymerized in the presence of a trialkyl aluminum, such as triethyl aluminum, at a temperature of about 140° to about 325° C. and a pressure of about 1000 p.s.i.g. to as high as 1000 atmospheres or even higher, for about 5 to about 120 minutes to obtain a mixture containing, for example, about 85 to 95 mol percent of normal alpha-olefins, about one to about 10 mol percent of internal straight chain olefins, about one to about 10 mol percent of trisubstituted monoolefins, that is, compounds of the structural formula $R_2C{=}CHR$, wherein R is an alkyl group, and about one to about 10 mol percent of vinylidenes, that is, compounds of the structural formula $R_2C{=}CH_2$, wherein R is an alkyl group. The olefins so obtained will have predominantly from two to twenty carbon atoms, although lesser amounts of olefins containing from about 22 to 40 carbon atoms will also be produced.

The mixture defined above, or any mixture containing said normal alpha-olefins and vinylidenes, can be treated, for example, by distillation, to recover individual normal alpha-olefins or fractions containing several individual normal alpha-olefins. Unfortunately, the other olefins defined above, particularly the vinylidenes, will remain in association with the individual normal alpha-olefins or fractions containing several individual normal alpha-olefins. A particularly attractive fraction obtained from the olefin mixture defined above is one containing $C_{12}$ to $C_{16}$ normal alpha-olefins which can be reacted with benzene to form a straight chain alkyl benzene which can then be sulfonaated, or otherwise treated, to form well known, highly biodegradable detergents. The normal alpha-olefins described above may be used as a feed stock in the carbonylation or Oxo reaction wherein an olefin is converted to an aldehyde having one more carbon atom than the starting olefin. The normal alpha-olefins described above can also be used in a nitric acid oxidation process for producing normal fatty acids wherein the fatty acid contains one carbon atom less than the starting olefin. In such processes, and in others as well, it is desirable to keep the concentration of contaminants, such as vinylidene compounds, as represented by the structural formula $$R_2C{=}CH_2$$

wherein R is an alkyl group, to a minimum, since they will react to form undesirable branched products. Further, it is particularly desirable to maximize the concentration of normal alpha-olefins present since this will enhance the economics of production, sale and use, an important consideration in a highly competitive field. By following the procedure defined and claimed herein, vinylidenes in a normal alpha-olefin mixture are substantially reduced, while at the same time the amounts of normal alpha-olefins are increased.

SUMMARY

I have discovered that normal alpha-olefins or mixtures thereof having from about 4 to about 20 carbon atoms in the molecule, preferably from about 12 to 16 carbon atoms in the molecule, containing contaminating amounts of vinylidene compounds can be substantially reduced in the quantity of vinylidene impurity present while the quantity of said normal alpha-olefins is increased by treating said normal alpha-olefins or mixtures thereof with a sulfonic acid cation exchange resin which possesses a macro-reticular structure. This reaction is characterized by the absence of polymerization and by the further absence of any effect by said catalyst upon the normal alpha-olefins present.

The catalyst employed in the process of the instant invention is a nuclear sulfonic polymer exhibiting a macroreticular structure. It can be prepared, for example, by the free radical catalyzed copolymerization of styrene with divinyl benzene in a liquid which is a solvent for the monomers but not the copolymer. The bead form of polymer obtained can be sulfonated by conventional means. Exemplary of the preparation of the catalyst employed in the process of the instant invention is that as set forth in lines 9 to 75 of column 4 of U.S. Patent No. 3,037,052. The catalyst employed in the examples herein is more precisely Catalyst A of Table I, column 8, lines 5 to 15, of the aforementioned patent. For further information concerning the preparation of catalysts of the type useful in the process of the instant invention, reference may be had, in addition to the aforementioned patent, to Kunin, R., E. Meitzner and N. Bortnick, J. Am. Chem. Soc., 84, 305 (1962) and Kunin, R., E. Meitzner, J. Oline, S. Fisher and N. Frisch, Ind. Eng. Chem., Prod. Res. and Dev., 1, 140 (1962).

The procedure of this invention resides in contacting a mixture of at least one normal alpha-olefin and at least one vinylidene under selected reaction conditions with a nuclear sulfonic cation exchange resin having a macroreticular structure. While the reaction conditions are not critical, they must be maintained at a level below that at which polymerization and other undesirable side reactions occur. Although I have found it most convenient to conduct the process of the instant invention at room temperature and atmospheric pressure, the process is operable in the temperature range of from about 10° to 50° C., preferably from 20° to 30° C., and in the pressure range of from about ½ to 2 atmospheres. The mixture to be treated and the catalyst are maintained in intimate contact with each other for a period which can be in the range of from 1 to 120 minutes or higher, preferably from about 1 to about 60 minutes. The quantity of catalyst employed can desirably range from about 1 to 50 percent by weight, preferably from about 10 to about 20 percent by weight based on total weight of the olefin mixture. The amount of catalyst used can exceed these values, but there appears to be no benefit from doing so and the increased cost would make such use uneconomical. The catalyst can be brought into reactive contact with the normal alphaolefin mixture by either a batchwise or continuous operation, as will be illustrated below.

It is to be noted that by this process the normal alpha-olefin mixture is ready for use immediately after the period of reactive contact with the catalyst is over. There are no undesirable side reactions and the necessity for subsequent treatment can therefore be obviated. Normal alpha-olefins, particularly those treated according to the process of the instant invention and therefore having a greater amount of n-alpha-olefin, are useful in the alkylation of aromatic hydrocarbons to produce biodegradable detergents. The olefin mixture can be used without further purification in such alkylation insofar as the amounts of impurities are relatively small. The alpha-olefin mixture as treated according to the method described is also useful as a feedstock in the Oxo process for the production of alcohols.

The more detailed operation of my invention is illustrated by the following examples. There are, of course, many forms of this invention obvious to one skilled in the chemical art once the invention has been revealed and it will accordingly be understood that these embodiments are illustrative of the invention and not limitations thereon.

DESCRIPTION OF THE PREFERRED EMBODIMENTS

The catalyst was prepared as follows: A mixture of styrene (121.6 grams), technical divinylbenzene (48.6 grams containing 50% active ingredient), 93 grams of tertiary amyl alcohol and 1.27 grams of benzoyl peroxide was charged into a solution of 6.5 grams of sodium chloride and 0.5 gram of the ammonium salt of a commercial styrenemaleic anhydride copolymer in 174 grams of water. The mixture was agitated until the organic components were dispersed as fine droplets and then heated to 86° to 88° C. for six hours. The resulting beads were filtered and washed with water and freed from excess water and amyl alcohol by drying at 115° C. at a pressure of 10 mm. for 4 hours.

This copolymer was converted to the sulfonic acid derivative by heating with agitation 75 grams of the copolymer with 750 grams of 99% sulfuric acid at 120° C. for six hours. The mixture was then cooled to about 20° C. and diluted with water. The diluted acid was removed by filtration and the resin washed with deionized water until free of acid. The washing was continued until the conductivity of the wash water had dropped to a constant level. The polymer was dehydrated by drying at 115° C. at a reduced pressure of about 5 mm. of mercury until a constant weight was obtained.

The catalyst described above was air dried at 105° C. for two hours to remove any absorbed moisture. A column 20 inches x ¼ inch was completely packed with the catalyst. Ten ml. (8 grams) of a $C_{12}$–$C_{16}$ normal alpha-olefin mixture, obtained by the polymerization of ethylene with triethylaluminum, was percolated through the column, the reaction conditions being room temperature and atmospheric pressure. After 5 minutes the fraction had passed through the column. The results are reported in Table I.

TABLE I

| | Untreated sample, mol percent | Treated sample, mol percent |
|---|---|---|
| Trans cis: | | |
| $RCH=CHR$ | 0.0 | 0.2 |
| $RCH=CHR$ | 1.0 | 1.8 |
| $RCH=CH_2$ | 91.4 | 93.2 |
| $R_2C=CH_2$ | 7.2 | 0.8 |
| $R_2C=CHR$ | 0.4 | 4.1 |

It is to be noted that the decrease in vinylidene content is quite significant, while the increase in alpha-olefin content appreciable.

Example II

This example illustrates a batch type operation. Two parts by weight of the catalyst prepared and dried as in Example I above were placed in a reaction vessel and 7 ml. (5.85 parts by weight) of a $C_{12}$–$C_{16}$ mixture of normal alpha-olefins, obtained by the polymerization of ethylene with triethylaluminum, were added and contact was maintained for 30 minutes. The mixture was not stirred. The liquid was decanted and analyzed. The results are reported in Table II below.

TABLE II

| | Untreated sample, mol percent | Treated sample, mol percent |
|---|---|---|
| Trans cis: | | |
| $RCH=CHR$ | 0.0 | 0.0 |
| $RCH=CHR$ | 1.0 | 1.6 |
| $RCH=CH_2$ | 91.4 | 93.7 |
| $R_2C=CH_2$ | 7.2 | 0.8 |
| $R_2C=CHR$ | 0.4 | 3.9 |

These results show a decrease in vinylidene content and an increase in alpha-olefin content which is approximately the same as that for the columnar type of treatment.

Example III

The catalyst, prepared as in Example I above, was dried under vacuum for six hours at 390° F. at a pressure of 1 mm. of Hg and then packed into a column 11 inches x ¼ inch. Ten ml. of a $C_{12}$–$C_{16}$ fraction of normal alpha-olefin mixture, obtained from the polymerization of ethylene with triethylaluminum, was passed through the column at room temperature and atmospheric pressure. After 3½ minutes the fraction was collected and analyzed. The results are reported in Table III.

TABLE III

| | Untreated sample, mol percent | Treated sample, mol percent |
|---|---|---|
| Trans cis: | | |
| $RCH=CHR$ | 0.0 | 0.0 |
| $RCH=CHR$ | 1.0 | 0.8 |
| $RCH=CH_2$ | 91.4 | 94.0 |
| $R_2C=CH_2$ | 7.2 | 1.5 |
| $R_2C=CHR$ | 0.4 | 3.7 |

The three experiments above quite clearly show that the normal alpha-olefin content in the treated sample is higher than the untreated sample and that the vinylidene content of the treated sample is far less than in the untreated sample. Although the amounts of trisubstituted olefins in the treated samples in each of the above examples have been increased, nevertheless the total amounts of substituted olefins in the treated samples are far less than the total amounts of substituted olefins in the untreated samples.

Not all cation exchange resins are useful in the practice of the instant invention under the conditions disclosed herein, as illustrated by the following example.

Example IV

A conventional type of sulfonated cation exchange resin was examined. Amberlite IR–120, a conventional divinylbenzene styrene copolymer, available from the Rohm and Haas Company, Philadelphia, Pa., was air dried for 2 hours at 105° C. and packed into a 20 inches x ¼ inch column. This particular resin is a sulfonated styrene-divinylbenzene copolymer containing 8.5% divinylbenzene. Ten ml. of a $C_{12}$–$C_{16}$ mixture of normal alpha-olefins was percolated through the column at room temperature and atmospheric pressure. The results are reported in Table IV below.

TABLE IV

| | Untreated sample, mol percent | Treated sample, mol percent |
|---|---|---|
| Trans cis: | | |
| $RCH=CHR$ | 1.8±1.0 | 1.6 |
| $RCH=CHR$ | 2.7±1.5 | 2.5 |
| $RCH=CH_2$ | 85.7±1.0 | 86.4 |
| $R_2C=CH_2$ | 5.6±1.5 | 5.6 |
| $R_2C=CHR$ | 4.1±1.5 | 3.8 |

As seen from the above, the use of a conventional styrene-divinylbenzene copolymer, that is one lacking the macro-reticular structure which characterizes the catalysts useful herein, yields results under the reaction conditions employed in this invention which are negligible when compared with those obtained by using a catalyst having a macro-reticular structure.

Obviously many modifications and variations of the invention, as hereinabove set forth, can be made without departing from the spirit and scope thereof, and therefore only such limitations should be imposed as are indicated in the appended claims.

I claim:

1. A process for decreasing the vinylidene content in a mixture containing alpha-olefins and vinylidenes which comprises contacting said mixture with the acid form of a sulfonic acid cation exchange resin which possesses a macro-reticular structure.

2. A process according to claim 1 in which the mixture containing alpha-olefins and vinylidenes contains a predominant amount of at least one normal alpha-olefin.

3. A process according to claim 1 in which the mixture of alpha-olefins and vinylidenes is percolated through a bed of said sulfonic acid cation exchange resin possessing a macro-reticular structure, the product is recovered and is characterized by a substantial decrease in the amount of vinylidenes and a substantial absence of polymerization products.

4. A process according to claim 1 in which the temperature during said treatment is maintained in the range of about 10° to about 50° C.

References Cited

UNITED STATES PATENTS 2,425,858  8/1947  Beach _____ 260—683.2

FOREIGN PATENTS 502,417  5/1954  Canada.

DELBERT E. GANTZ, *Primary Examiner.*

J. D. MYERS, *Assistant Examiner.*

U.S. Cl. X.R.

260—683.2, 683